(12) United States Patent
Wu et al.

(10) Patent No.: US 11,019,625 B2
(45) Date of Patent: May 25, 2021

(54) ENHANCEMENT OF MAC SIGNALING FOR NETWORK-ASSISTED V2X RESOURCE SCHEDULING IN PC5 MULTI-CARRIER OPERATION

(71) Applicant: QUALCOMM Incorporated, San Diego, CA (US)

(72) Inventors: Zhibin Wu, Bedminster, NJ (US); Sudhir Kumar Baghel, Hillsborough, NJ (US); Kapil Gulati, Dover, DE (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/140,456

(22) Filed: Sep. 24, 2018

(65) Prior Publication Data
US 2019/0098651 A1 Mar. 28, 2019

Related U.S. Application Data

(60) Provisional application No. 62/564,847, filed on Sep. 28, 2017, provisional application No. 62/569,303, filed on Oct. 6, 2017.

(51) Int. Cl.
*H04W 72/04* (2009.01)
*H04W 72/12* (2009.01)
(Continued)

(52) U.S. Cl.
CPC ....... *H04W 72/0453* (2013.01); *H04L 1/1614* (2013.01); *H04W 4/40* (2018.02);
(Continued)

(58) Field of Classification Search
CPC ................................................ H04W 74/0453
See application file for complete search history.

(56) References Cited

U.S. PATENT DOCUMENTS

2015/0024763 A1* 1/2015 Lee ............. H04W 72/082
455/450
2016/0302181 A1* 10/2016 Fujishiro ........... H04W 72/0406
(Continued)

FOREIGN PATENT DOCUMENTS

| EP | 3119148 A1 | 1/2017 |
|---|---|---|
| EP | 3211959 A1 | 8/2017 |
| WO | 2011051745 A1 | 5/2011 |

OTHER PUBLICATIONS

Guangdong Oppo Mobile Telecom: "Mode 3 Support in eV2X Carrier Aggregation", 3GPP Draft, R1-1713250, 3rd Generation Partnership Project (3GPP), Mobile Competence Centre, 659, Route Des Lucioles, F-96921 Sophia-Antipolis Cedex, France, vol. RAN WG1, No. Prague, P.R. Czechia, Aug. 21, 2017-Aug. 25, 2017, Aug. 20, 2017 (Aug. 20, 2017), XP051316057, 4 Pages, Retrieved from the Internet: URL:http://www.3gpp.org/ftp/Meetings_3GPP_SYNC/RAN1/Docs/ [retrieved on Aug. 20, 2017].
(Continued)

*Primary Examiner* — Jason E Mattis
(74) *Attorney, Agent, or Firm* — Loza & Loza LLP

(57) ABSTRACT

Aspects of the disclosure relate to a method of operating a scheduled entity for wireless communication with a network. In some aspects, the scheduled entity obtains data that is to be transmitted, wherein one or more frequencies are available for transmission of the data. The scheduled entity transmits, to a scheduling entity, a message that includes an amount of the data to be transmitted and a frequency parameter indicating at least one of the one or more frequencies to be used for the transmission of the data. The scheduled entity obtains, from the scheduling entity, a resource grant based on the message and transmits the data based on the resource grant. Other aspects, embodiments, and features are also claimed and described.

26 Claims, 8 Drawing Sheets

(51) Int. Cl.
  *H04L 1/16*   (2006.01)
  *H04W 28/02*  (2009.01)
  *H04W 4/40*   (2018.01)
  *H04W 72/14*  (2009.01)
  *H04W 80/02*  (2009.01)

(52) U.S. Cl.
  CPC ... *H04W 28/0278* (2013.01); *H04W 72/1252* (2013.01); *H04W 72/1263* (2013.01); *H04W 72/14* (2013.01); *H04W 80/02* (2013.01)

(56) References Cited

U.S. PATENT DOCUMENTS

2017/0064734 A1* 3/2017 Tsuboi .............. H04W 72/1268
2020/0229194 A1* 7/2020 Belleschi ................ H04L 5/003

OTHER PUBLICATIONS

International Search Report and Written Opinion—PCT/US2018/052681—ISA/EPO—dated Nov. 27, 2018.

\* cited by examiner

ENHANCEMENT OF MAC SIGNALING FOR NETWORK-ASSISTED V2X RESOURCE SCHEDULING IN PC5 MULTI-CARRIER OPERATION

PRIORITY CLAIM

This application claims priority to and the benefit of U.S. Provisional Application No. 62/564,847 filed in the U.S. patent office on Sep. 28, 2017 and U.S. Provisional Application No. 62/569,303 filed in the U.S. patent office on Oct. 6, 2017, the entire contents of which are incorporated herein by reference as if fully set forth below in their entireties and for all applicable purposes.

TECHNICAL FIELD

The technology discussed below relates generally to wireless communication systems, and more particularly, to a method and apparatus for enhancement of medium access control (MAC) signaling for network-assisted vehicle-to-everything (V2X) resource scheduling in PC5 multi-carrier operation.

INTRODUCTION

Multi-carrier and carrier aggregation (CA) operations may be supported by Long Term Evolution (LTE)-based Vehicle-to-Everything (V2X) protocols. For example, a user equipment (UE), such as a vehicle, may be allowed to use multiple carriers for the transmission of V2X messages. However, each carrier may not be equivalent, as the use of some carriers may be allowed for certain V2X services and some carriers may not. This kind of information, as known by each UE implementing V2X protocols, may not be known to the wireless communication network (e.g., at a base station of the wireless communication network). Therefore, the wireless communication network may not be able to allocate the appropriate resources to a UE when implementing network-assisted dynamic scheduling.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for wireless communication is disclosed. The method may be performed by a scheduled entity (e.g., a user equipment (UE)). The method includes obtaining data that is to be transmitted, wherein one or more frequencies are available for transmission of the data. The method further includes transmitting, to a scheduling entity, a message that includes an amount of the data to be transmitted and a frequency parameter indicating at least one of the one or more frequencies to be used for the transmission of the data, obtaining, from the scheduling entity, a resource grant based on the message, and transmitting the data based on the resource grant.

In one example, an apparatus for wireless communication is disclosed. The apparatus may be a scheduled entity (e.g., a UE). The apparatus includes a processor, a transceiver communicatively coupled to the processor, and a memory communicatively coupled to the processor. The processor is configured to obtain data that is to be transmitted, wherein one or more frequencies are available for transmission of the data. The processor is further configured to transmit, to a scheduling entity, a message that includes an amount of the data to be transmitted and a frequency parameter indicating at least one of the one or more frequencies to be used for the transmission of the data, obtain, from the scheduling entity, a resource grant based on the message, and transmit the data based on the resource grant.

In one example, an apparatus for wireless communication is disclosed. The apparatus may be a scheduled entity (e.g., a UE). The apparatus includes means for obtaining data that is to be transmitted, wherein one or more frequencies are available for transmission of the data, means for transmitting, to a scheduling entity, a message that includes an amount of the data to be transmitted and a frequency parameter indicating at least one of the one or more frequencies to be used for the transmission of the data, means for obtaining, from the scheduling entity, a resource grant based on the message, and means for transmitting the data based on the resource grant.

In one example, a non-transitory machine-readable storage medium is disclosed. The machine-readable storage medium having one or more instructions which when executed by a processing circuit causes the processing circuit to obtain data that is to be transmitted, wherein one or more frequencies are available for transmission of the data, transmit, to a scheduling entity, a message that includes an amount of the data to be transmitted and a frequency parameter indicating at least one of the one or more frequencies to be used for the transmission of the data, obtain, from the scheduling entity, a resource grant based on the message, and transmit the data based on the resource grant.

In one example, a method for wireless communication is disclosed. The method may be performed by a scheduling entity (e.g., a base station). The method includes obtaining, from a scheduled entity, a message that includes an amount of data to be transmitted and a frequency parameter indicating one or more frequencies to be used for transmission of the data, and transmitting, to the scheduled entity, a resource grant based on the message.

In one example, an apparatus for wireless communication is disclosed. The apparatus may be a scheduling entity (e.g., a base station). The apparatus includes a processor, a transceiver communicatively coupled to the processor, and a memory communicatively coupled to the processor. The processor is configured to obtain, from a scheduled entity, a message that includes an amount of data to be transmitted and a frequency parameter indicating one or more frequencies to be used for transmission of the data, and transmit, to the scheduled entity, a resource grant based on the message.

In one example, an apparatus for wireless communication is disclosed. The apparatus may be a scheduling entity (e.g., a base station). The apparatus includes means for obtaining, from a scheduled entity, a message that includes an amount of data to be transmitted and a frequency parameter indicating one or more frequencies to be used for transmission of the data, and means for transmitting, to the scheduled entity, a resource grant based on the message.

In one example, a non-transitory machine-readable storage medium is disclosed. The machine-readable storage medium having one or more instructions which when executed by a processing circuit causes the processing circuit to obtain, from a scheduled entity, a message that includes an amount of data to be transmitted and a frequency parameter indicating one or more frequencies to be used for transmission of the data, and transmit, to the scheduled entity, a resource grant based on the message.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
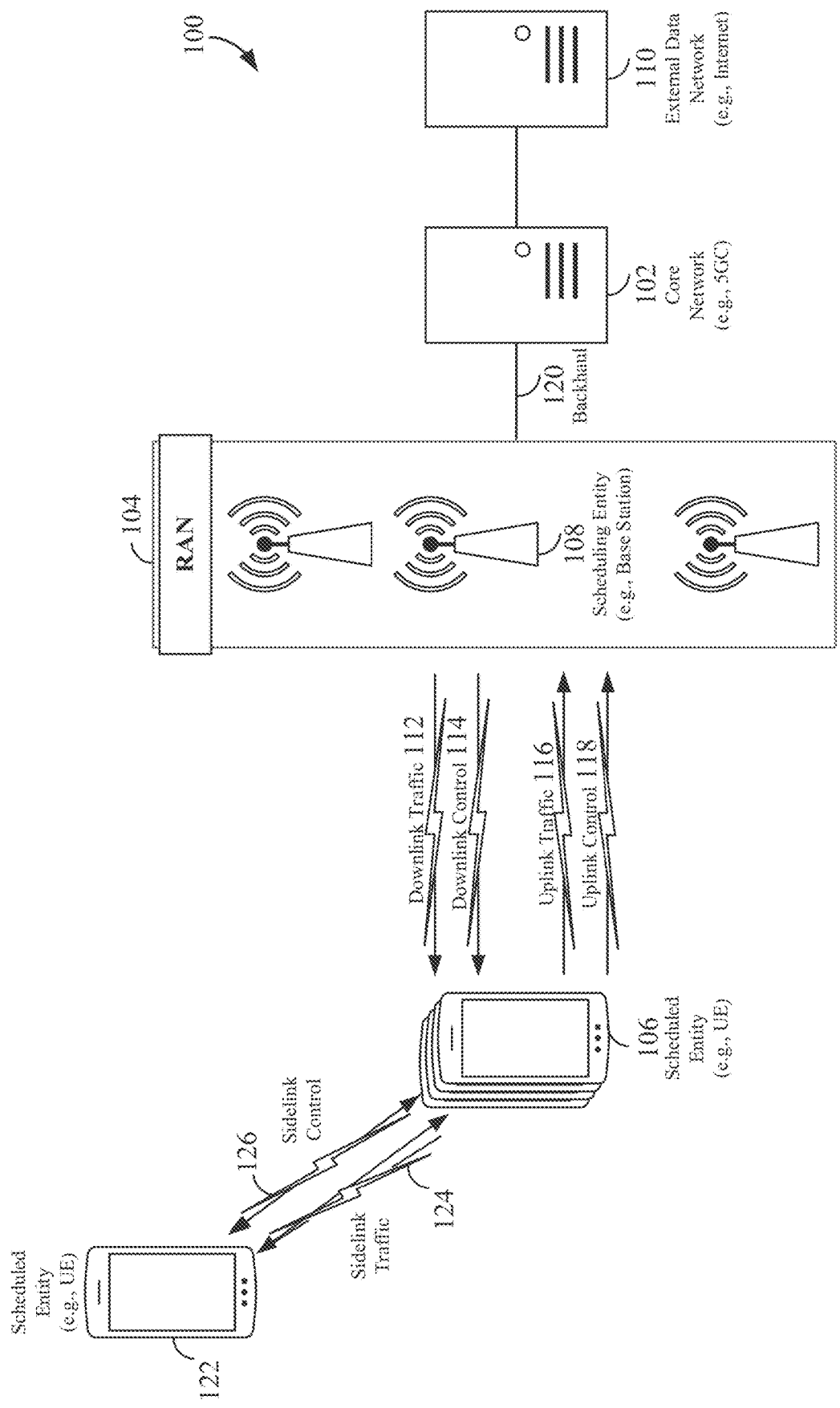
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell.

Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some examples, scheduled entities such as the scheduled entity 106 and the scheduled entity 122 may utilize sidelink signals for direct D2D communication. Sidelink signals may include sidelink traffic 124 and sidelink control 126. Sidelink control information 126 may in some examples include a request signal, such as a request-to-send (RTS), a source transmit signal (STS), and/or a direction selection signal (DSS). The request signal may provide for a scheduled entity 106, 122 to request a duration of time to keep a sidelink channel available for a sidelink signal. Sidelink control information 126 may further include a response signal, such as a clear-to-send (CTS) and/or a destination receive signal (DRS). The response signal may provide for the scheduled entity 106, 122 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 124. In some aspects, the sidelink traffic 124 and/or sidelink control 126 may be communicated via a PC5 interface. In such aspects, the PC5 interface may support multicarrier transmissions and/or carrier aggregation (CA). For example, when LTE-based vehicle-to-everything (V2X) communication protocols are implemented by the scheduled entity 106, the scheduled entity 106 may be allowed to use multiple carriers for the transmission of V2X messages.

Figure 2:
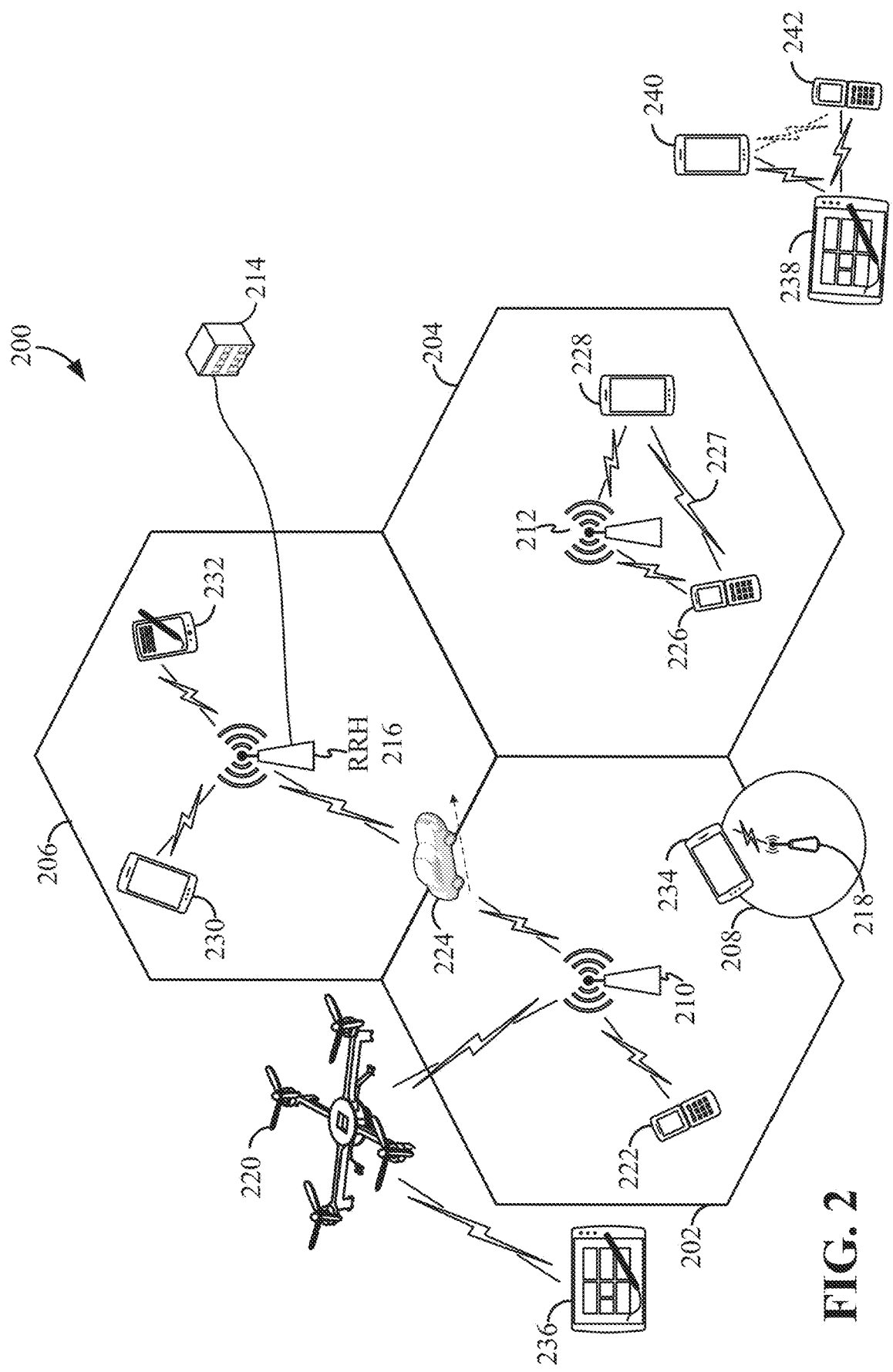
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
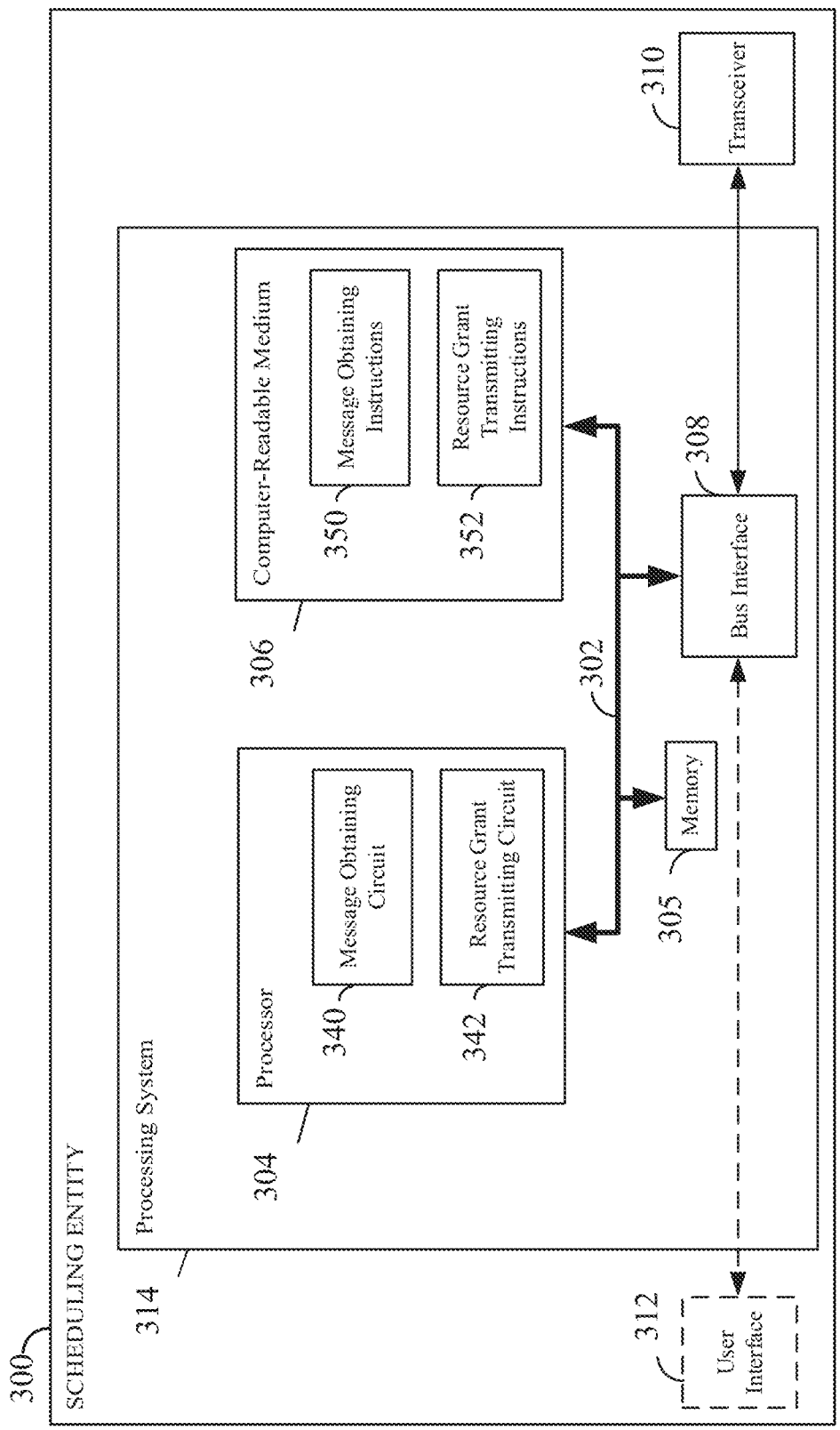
FIG. 3 is a block diagram conceptually illustrating an example of a hardware implementation for a scheduling entity according to some aspects of the disclosure.

FIG. 3 is a block diagram illustrating an example of a hardware implementation for a scheduling entity 300 employing a processing system 314. For example, the scheduling entity 300 may be a base station as illustrated in any one or more of FIGS. 1, 2, and/or 3.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIG. 7.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided. Of course, such a user interface 312 is optional, and may be omitted in some examples, such as a base station.

In some aspects of the disclosure, the processor 304 may include message obtaining circuitry 340 configured for various functions, including, for example, obtaining, from a scheduled entity, a message that includes an amount of data to be transmitted and a frequency parameter indicating one or more frequencies to be used for transmission of the data. For example, the message obtaining circuitry 340 may be configured to implement one or more of the functions described below in relation to FIG. 7, including, e.g., block 702.

In some aspects of the disclosure, the processor 304 may include resource grant transmitting circuitry 342 configured for various functions, including, for example, transmitting, to the scheduled entity, a resource grant based on the message. For example, the resource grant transmitting circuitry 342 may be configured to implement one or more of the functions described below in relation to FIG. 7, including, e.g., block 704.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include message obtaining software 350 configured for various functions, including, for example, obtaining, from a scheduled entity, a message that includes an amount of data to be transmitted and a frequency parameter indicating one or more frequencies to be used for transmission of the data. For example, the message obtaining software 350 may be configured to implement one or more of the functions described above in relation to FIG. 7, including, e.g., block 702.

In one or more examples, the computer-readable storage medium 306 may include resource grant transmitting software 352 configured for various functions, including, for example, transmitting, to the scheduled entity, a resource grant based on the message. For example, the resource grant transmitting software 352 may be configured to implement one or more of the functions described above in relation to FIG. 7, including, e.g., block 704.

Figure 4:
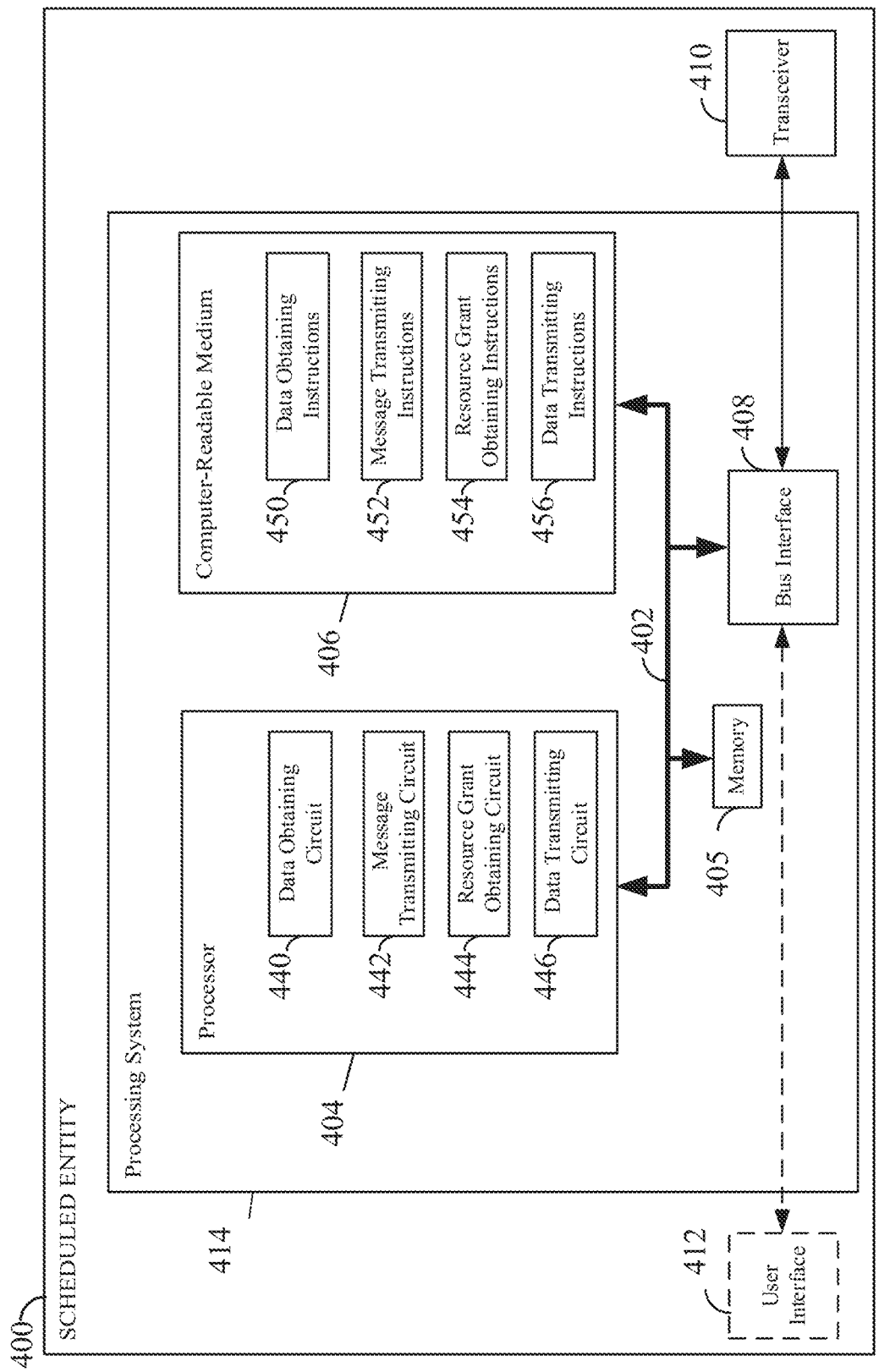
FIG. 4 is a block diagram conceptually illustrating an example of a hardware implementation for a scheduled entity according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1, 2, and/or 4.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. That is, the processor 404, as utilized in a scheduled entity 400, may be used to implement any one or more of the processes described below and illustrated in FIG. 8.

In some aspects of the disclosure, the processor 404 may include data obtaining circuitry 440 configured for various functions, including, for example, obtaining data that is to be transmitted, wherein one or more frequencies are available for transmission of the data. For example, the data obtaining circuitry 440 may be configured to implement one or more of the functions described below in relation to FIG. 8, including, e.g., block 802.

In some aspects of the disclosure, the processor 404 may include message transmitting circuitry 442 configured for various functions, including, for example, transmitting, to a scheduling entity, a message that includes an amount of the data to be transmitted and a frequency parameter indicating at least one of the one or more frequencies to be used for the transmission of the data. For example, the message transmitting circuitry 442 may be configured to implement one or more of the functions described below in relation to FIG. 8, including, e.g., block 804.

In some aspects of the disclosure, the processor 404 may include resource grant obtaining circuitry 444 configured for various functions, including, for example, obtaining, from the scheduling entity, a resource grant based on the message. For example, the resource grant obtaining circuitry 444 may be configured to implement one or more of the functions described below in relation to FIG. 8, including, e.g., block 806.

In some aspects of the disclosure, the processor 404 may include data transmitting circuitry 446 configured for various functions, including, for example, transmitting the data based on the resource grant. For example, the data transmitting circuitry 446 may be configured to implement one or more of the functions described below in relation to FIG. 8, including, e.g., block 808.

In one or more examples, the computer-readable storage medium 406 may include data obtaining software 450 configured for various functions, including, for example, obtaining data that is to be transmitted, where one or more frequencies are available for transmission of the data. For example, the data obtaining software 450 may be configured to implement one or more of the functions described herein in relation to FIG. 8, including, e.g., block 802.

In one or more examples, the computer-readable storage medium 406 may include message transmitting software 452 configured for various functions, including, for example, transmitting, to a scheduling entity, a message that includes an amount of the data to be transmitted and a frequency parameter indicating at least one of the one or more frequencies to be used for the transmission of the data. For example, the message transmitting software 452 may be configured to implement one or more of the functions described herein in relation to FIG. 8, including, e.g., block 804.

In one or more examples, the computer-readable storage medium 406 may include resource grant obtaining software 454 configured for various functions, including, for example, obtaining, from the scheduling entity, a resource grant based on the message. For example, the resource grant obtaining software 454 may be configured to implement one or more of the functions described herein in relation to FIG. 8, including, e.g., block 806.

In one or more examples, the computer-readable storage medium 406 may include data transmitting software 456 configured for various functions, including, for example, transmitting the data based on the resource grant. For example, the data transmitting software 456 may be configured to implement one or more of the functions described herein in relation to FIG. 8, including, e.g., block 808.

For scheduling entity-assisted dynamic scheduling (also referred to as network-assisted dynamic scheduling), a scheduled entity (e.g., a UE) may need to precisely indicate to the scheduling entity (e.g., a base station) the buffered data size for each carrier (e.g., frequency) utilized for the sidelink or for each subset of allowed carriers. This may enable the scheduling entity to allocate an amount of resources to the scheduled entity in sidelink (SL) grants that approximately match the resource needs of the scheduled entity. The indication of such information to the scheduling entity may improve the efficiency of resource usage, thereby enabling V2X systems to reach their safety goals. Moreover, the indication of such information to the scheduling entity may effectively improve the performance of multi-carrier sidelink operations and/or sidelink carrier aggregation.

A scheduled entity may use a sidelink buffer status reporting procedure to provide a scheduling entity information about the amount of sidelink data available for transmission in the sidelink buffers associated with the medium access control (MAC) entity. This sidelink buffer status reporting procedure may be used for a variety of different applications that involve the use of the sidelink (also referred to as a PC5 interface), which may include D2D communications and V2X communications. A scheduled entity may transmit a conventional sidelink buffer status report (BSR) message to a scheduling entity over the Uu interface (e.g., the wireless interface between a scheduling entity and a scheduled entity) to inform the scheduling entity about the status of the sidelink buffer. However, such a conventional sidelink BSR message may not have the capability to indicate one or more sidelink carriers (e.g., frequencies) on which the data needs to be transmitted from the scheduled entity. Therefore, the scheduling entity may not be made aware of the one or more frequencies on which the data needs to be transmitted from the scheduled entity and, consequently, the scheduling entity may not efficiently allocate resources to the scheduled entity in sidelink (SL) resource grants.

First Buffer Status Report Format

Figure 5:
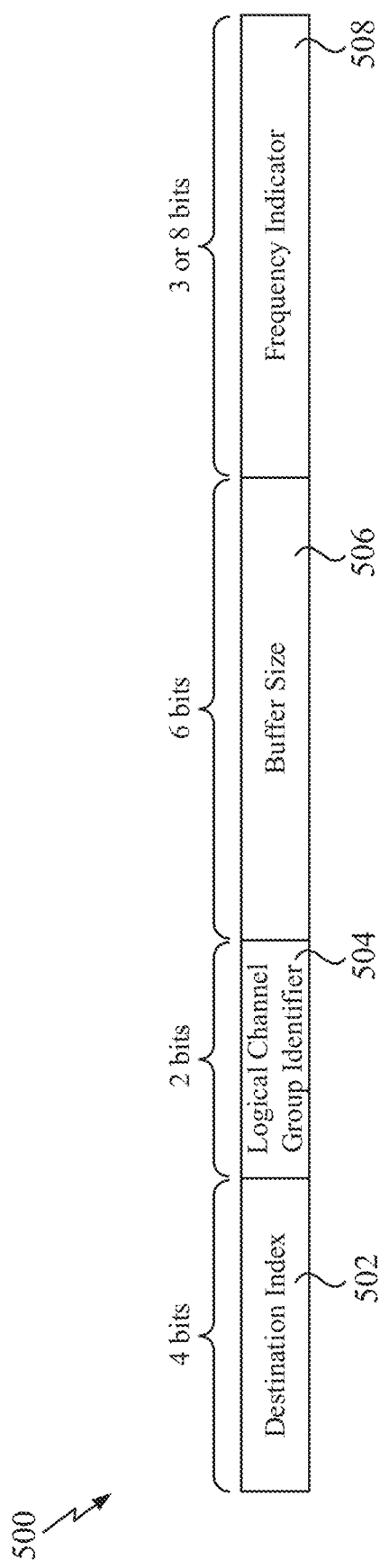
FIG. 5 is a diagram of a first buffer status report format in accordance with various aspects of the disclosure.

In one aspect of the present disclosure, with reference to FIG. 5, the scheduled entity 400 may perform a sidelink buffer status reporting procedure by implementing a first BSR format 500. The first BSR format 500 may include a destination index field 502, a logical channel group identifier (LCG ID) field 504, a buffer size field 506, and a frequency indicator field 508. In the example configuration of FIG. 5, the destination index field 502 may be a 4-bit field, the LCG ID field 504 may be a 2-bit field, the buffer size field 506 may be a 6-bit field, and the frequency indicator field 508 may be a 3-bit field (e.g., when configured to include a frequency index value) or an 8-bit field (e.g., when configured to include a frequency bitmap). A buffer size as described herein may be represented by an indexed value (e.g., a 6-bit value) that indicates an amount of data to be transmitted from the scheduled entity 400.

The frequency indicator field 508 may include a frequency parameter that indicates frequency information, such as one or more frequencies on which the data is to be transmitted from the scheduled entity 400. For example, if the network supports up to eight different transmission frequencies (also referred to as carriers), the frequency parameter may be a frequency index value within the range 0-7. In some examples, the frequency index value may point to actual frequencies (e.g., an E-UTRA absolute radio frequency channel number (EARFCN)) which have been configured utilizing radio resource control (RRC) signaling (e.g., using the v2x-InterFreqInfoList in system information block type 21 (SIB21) or RRCConnectionReconfiguration). Each of the actual frequencies described herein may, for example, refer to a frequency value (e.g., in terms of megahertz (MHz) or other appropriate unit of frequency) that can be represented by an EARFCN. Therefore, in these examples, the frequency index value may point to an EARFCN to indicate the frequency value of a carrier. In other examples, the frequency index value may point to actual frequencies (e.g., an EARFCN) which are preconfigured at the network (e.g., using a preconfigured frequency list).

In an aspect of the disclosure, a common frequency list (e.g., a frequency list for multiple scheduled entities) may be provided to the scheduled entity 400 via RRC broadcast signaling (e.g., v2x-InterFreqInfoList in SIB21). In such aspect, the frequency index value may point to actual frequencies in the common frequency list. In another aspect of the disclosure, a dedicated frequency list (e.g., a frequency list that is specific to one scheduled entity) may be provided to the scheduled entity 400 via dedicated RRC signaling (e.g., v2x-InterFreqInfoList in the RRCConnectionReconfiguration message). In such aspect, the frequency index value may point to actual frequencies in the dedicated frequency list. In a further aspect of the disclosure, if both the common frequency list and the dedicated frequency list are provided to the scheduled entity 400, the scheduled entity 400 may interpret the frequency index value as a value that points to actual frequencies in the dedicated frequency list. In such aspect, for example, the frequency index value may correspond to a frequency in the dedicated frequency list and not to a frequency in the common frequency list. In an aspect of the disclosure, after the scheduling entity 300 receives such a frequency indication (e.g., the frequency index value) from the scheduled entity 400 in a sidelink buffer status report, the scheduling entity 300 may allocate corresponding radio resources of the indicated frequency to the scheduled entity 400 in one or more resource grants (also herein referred to as sidelink (SL) resource grants).

As described herein, the frequency parameter included in the frequency indicator field 508 may have one or more formats. In one aspect of the disclosure, the frequency parameter may be an m-bit frequency index value that indicates a single frequency (e.g., a single carrier). In such aspect, for example, the frequency parameter may be a 3-bit frequency index value that indicates one of eight available frequencies. In another aspect of the disclosure, the frequency parameter may be an n-bit bitmap value indicating one or more frequencies that are allowed (e.g., for multi-carrier transmissions) for the transmission of data, where the size of the data to be transmitted is indicated in the buffer size field 506. In such aspect, for example, the frequency parameter may be an 8-bit bitmap value.

In one aspect of the disclosure, all data in a buffer of the scheduled entity 400 may be indexed based on a particular frequency. Accordingly, in some aspects of the disclosure, an LCG ID and a corresponding buffer size (also referred to as an LCG ID and buffer size pair) may be provided for each 3-bit frequency index value. It should be understood that a BSR may include one or more LCG ID and buffer size pairs for each 3-bit frequency index value.

In another aspect of the disclosure, all data in a buffer of the scheduled entity 400 may be indexed based on a particular service type. For example, for all data in a buffer of the scheduled entity 400 that belongs to a particular service (e.g., identified using a provider service identifier (PSID) or other upper layer service identifiers), the scheduled entity 400 may assemble the LCG ID and buffer size pairs and may indicate the allowed frequencies associated with this service. For example, the scheduled entity 400 may indicate the allowed frequencies using one or more of the m-bit frequency index values (e.g., one or more 3-bit frequency index values) or an n-bit bitmap value (e.g., an 8-bit bitmap value).

In another aspect of the disclosure, the scheduled entity 400 may index all buffer status data associated with an LCG. In this aspect, for each LCG ID, the buffer size may be given. The scheduled entity 400 may indicate the allowed frequencies associated with this service using one or more of the m-bit frequency index values (e.g., one or more 3-bit frequency index values) or an n-bit bitmap value (e.g., an 8-bit bitmap value).

Second Buffer Status Report Format

Figure 6:
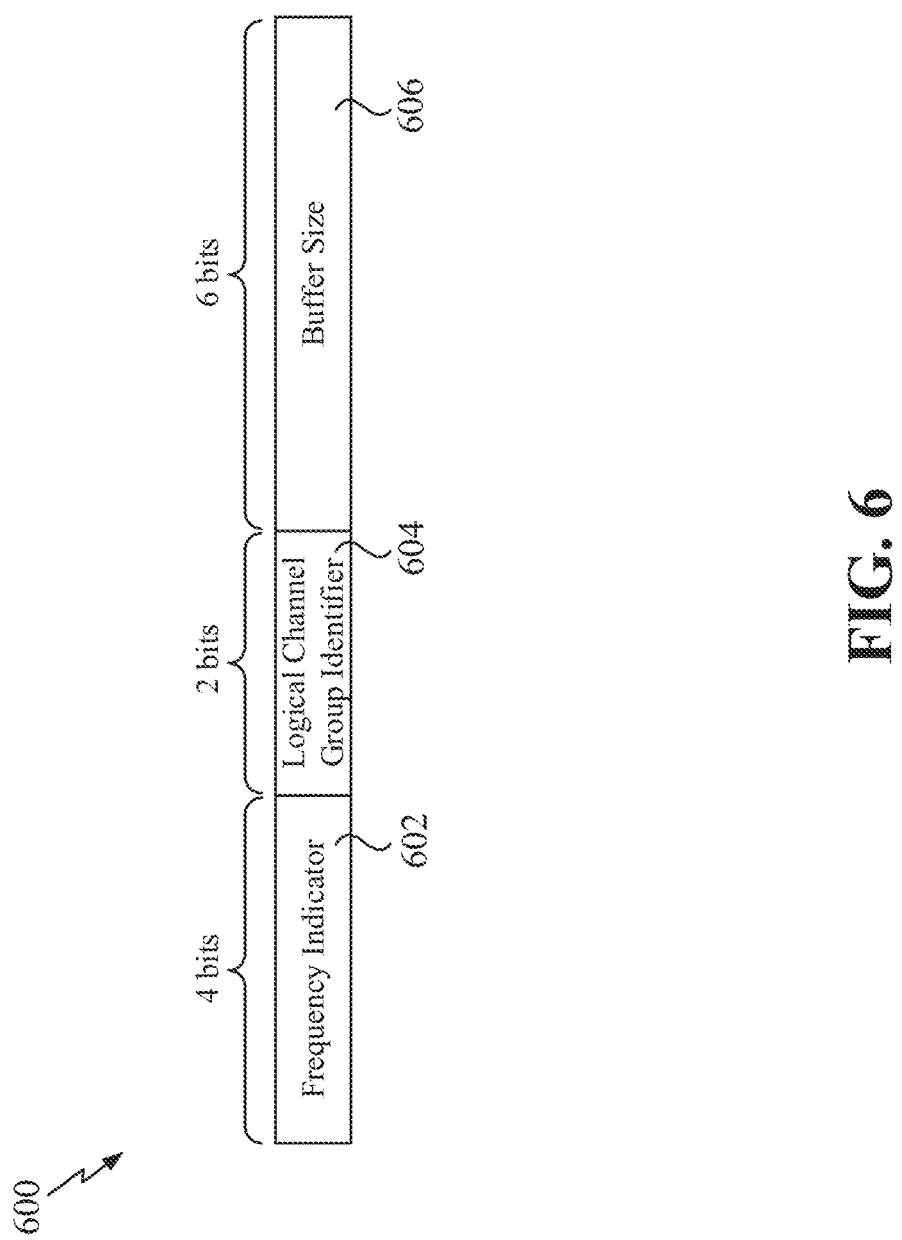
FIG. 6 is a diagram of a second buffer status report format in accordance with various aspects of the disclosure.

In some aspects of the disclosure, with reference to FIG. 6, the scheduled entity 400 may perform a sidelink BSR procedure by implementing a second BSR format 600. As discussed herein, the second BSR format 600 may enable communication of a frequency parameter that indicates frequency information, such as one or more frequencies on which data is to be transmitted from the scheduled entity 400. The frequency parameter may be a k-bit frequency index value that indicates a single frequency. In such aspect, for example, the frequency parameter may be a 4-bit frequency index value that may be used to indicate one of eight available frequencies.

The k-bit frequency index value may point to actual frequencies (e.g., an EARFCN) which have been configured in RRC signaling (e.g., using the v2x-InterFreqInfoList in SIB21 or RRCConnectionReconfiguration). In other examples, the frequency index value may point to actual frequencies (e.g., an EARFCN) which are preconfigured at the network (e.g., using a preconfigured frequency list). In an aspect of the disclosure, a common frequency list (e.g., a frequency list for multiple scheduled entities) may be provided to the scheduled entity 400 via RRC broadcast signaling (e.g., v2x-InterFreqInfoList in SIB21). In such aspect, the k-bit frequency index value may point to actual frequencies in the common frequency list. In another aspect of the disclosure, a dedicated frequency list (e.g., a frequency list that is specific to one scheduled entity) may be provided to the scheduled entity via dedicated RRC signaling (e.g., v2x-InterFreqInfoList in the RRCConnectionReconfiguration message). In such aspect, the k-bit frequency index value may point to actual frequencies in the dedicated frequency list. In a further aspect of the disclosure, if both the common frequency list and the dedicated frequency list are provided to the scheduled entity 400, the scheduled entity 400 may interpret the k-bit frequency index value as a value that points to actual frequencies in the dedicated frequency list. In such aspect, for example, the k-bit frequency index value may correspond to a frequency in the dedicated frequency list and not to a frequency in the common frequency list.

In some aspects of the present disclosure, the scheduled entity 400 may perform a sidelink buffer status reporting procedure by implementing the second BSR format 600. The second BSR format 600 may include a frequency indicator field 602, a logical channel group identifier (LCG ID) field 604, and a buffer size field 606. In the example configuration of FIG. 6, the frequency indicator field 602 may be a 4-bit field, the LCG ID field 604 may be a 2-bit field, and the buffer size field 606 may be a 6-bit field.

It should be noted that the second BSR format 600 may be achieved by using the destination index field included in a conventional BSR message format to indicate the previously described frequency parameter (e.g., the k-bit frequency index value may be included in the destination index field). Such use of the destination index field of a conventional BSR message may be possible since the destination index may not be used for some applications (e.g., V2X sidelink communication).

In some aspects of the disclosure, the scheduled entity 400 may transmit one or more BSR messages to the scheduling entity 300 using the first BSR format 500 or the second BSR format 600. In one aspect of the disclosure, the scheduled entity 400 may assemble all the buffer sizes for all the corresponding frequencies in one BSR message (also referred to as a long BSR message). In another aspect of the disclosure, the scheduled entity may transmit a number of BSR messages one by one (e.g., consecutively) to the scheduling entity 300. Each of these BSR messages may be associated with a particular frequency, a particular (upper-layer) service, and/or a particular LCG.

Figure 7:
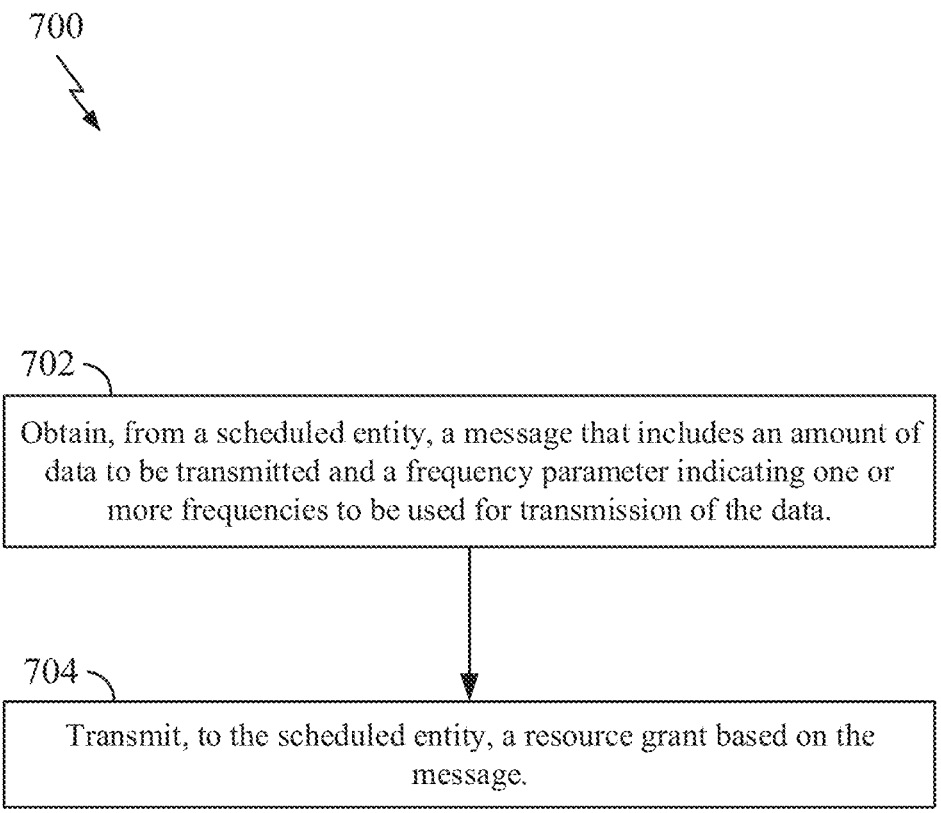
FIG. 7 is a flow chart illustrating an exemplary process according to some aspects of the disclosure.

FIG. 7 is a flow chart illustrating an exemplary process 700 in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the scheduling entity 300 illustrated in FIG. 3. In some examples, the process 700 may be carried out by any suitable apparatus or means for carrying out the functions or algorithm described below.

At block 702, the scheduling entity may obtain, from a scheduled entity, a message that includes an amount of data to be transmitted (e.g., over a sidelink) and a frequency parameter indicating one or more frequencies (e.g., one or more sidelink frequencies) to be used for transmission of the data. For example, the message may be a sidelink buffer status report based on the first BSR format 500 or the second BSR format 600. Accordingly, in one aspect of the disclosure, the scheduling entity may determine the amount of data to be transmitted (e.g., over the sidelink) from the scheduled entity by obtaining the buffer size (e.g., sidelink buffer size) from the message (e.g., in the buffer size field 506 in FIG. 5) and may determine the one or more frequencies to be used for transmission of the data by obtaining the frequency parameter from the message (e.g., in the frequency indicator field 508 in FIG. 5).

At block 704, the scheduling entity may transmit, to the scheduled entity, a resource grant based on the message. In one example scenario, if the data to be transmitted (e.g., over the sidelink) from the scheduled entity is only allowed to be transmitted using a single frequency (e.g., a single sidelink frequency), as indicated by the frequency parameter in the received message, the scheduling entity may be required to schedule transmission of that data on that single frequency in the resource grant. In another example scenario, if the data to be transmitted (e.g., over the sidelink) from the scheduled entity is allowed to be transmitted on two or more frequencies (e.g., two or more sidelink frequencies) as indicated by the frequency parameter in the received message, the scheduling entity may schedule transmission of that data on any one of the two or more frequencies, or any combination of those frequencies which the scheduling entity deems feasible, in one or more resource grants. For example, in any of the example resource grants described with respect to block 704, the frequency (or frequencies) to be used by the scheduled entity for transmission (e.g., over the sidelink) may be indicated in one or more ways. For example, a frequency to be used may be indicated in a resource grant in the Carrier Indicator Field (CIF) of Downlink Control Information (DCI) (e.g., DCI format 5A) in a Physical Downlink Control Channel (PDCCH).

In one configuration, the apparatus 300 for wireless communication includes means for obtaining, from a scheduled entity, a message that includes an amount of data to be transmitted and a frequency parameter indicating one or more frequencies to be used for transmission of the data, and means for transmitting, to the scheduled entity, a resource grant based on the message. In one aspect, the aforementioned means may be the processor 304 configured to perform the functions recited by the aforementioned means. In another aspect, the aforementioned means may be a circuit or any apparatus configured to perform the functions recited by the aforementioned means.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIGS. 1, 2, and/or 3, and utilizing, for example, the processes and/or algorithms described herein in relation to FIG. 7.

Figure 8:
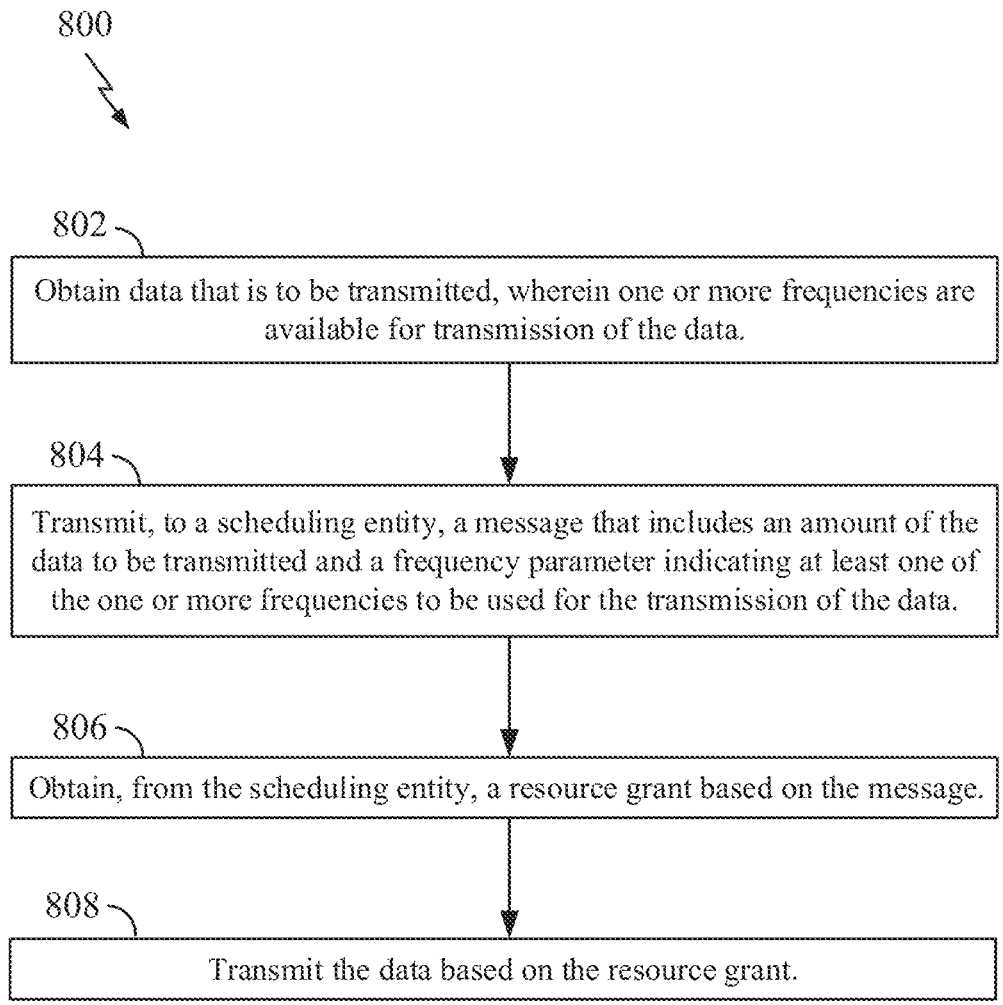
FIG. 8 is a flow chart illustrating an exemplary process according to some aspects of the disclosure.

FIG. 8 is a flow chart illustrating an exemplary process 800 in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the scheduled entity 400 illustrated in FIG. 4. In some examples, the process 800 may be carried out by any suitable apparatus or means for carrying out the functions or algorithm described below.

At block 802, the scheduled entity may obtain data that is to be transmitted, wherein one or more frequencies are available for transmission of the data. For example, the scheduled entity may obtain the data that is to be transmitted by generating or receiving one or more data packets, and storing the one or more data packets in a transmission buffer of the scheduled entity. In one scenario, the scheduled entity may be required to transmit (e.g., via a PC5 interface) the one or more data packets using a single frequency. In another scenario, the scheduled entity may be allowed to transmit (e.g., via a PC5 interface) the one or more data packets using any one of two or more frequencies, or a combination of the two or more frequencies.

At block 804, the scheduled entity may transmit, to a scheduling entity, a message that includes an amount of the data to be transmitted and a frequency parameter indicating at least one of the one or more frequencies to be used for the transmission of the data. For example, the message may be a sidelink buffer status report based on the first BSR format 500 or the second BSR format 600. Accordingly, in one aspect of the disclosure, the scheduled entity may determine the amount of data (e.g., a buffer size of the transmission buffer) to be transmitted and may include the buffer size (e.g., a 6-bit index value) in the message (e.g., in the buffer size field 506 in FIG. 5). The scheduled entity may determine the one or more frequencies to be used for transmission of the data and may include a frequency parameter indicating the one or more frequencies in the message (e.g., in the frequency indicator field 508 in FIG. 5).

At block 806, the scheduled entity may obtain, from the scheduling entity, a resource grant based on the message. For example, since the frequency parameter in the message from the scheduled entity indicates the one or more frequencies to be used for the data transmission, the resource grant may schedule transmission of the data on the one or more frequencies. Therefore, in one example scenario, if the data to be transmitted from the scheduled entity is allowed to be transmitted on two or more frequencies as indicated by the frequency parameter in the message transmitted to the scheduling entity, the scheduling entity may schedule transmission of that data on any one of the two or more frequencies, or any combination of those frequencies which the scheduling entity deems feasible, in the obtained resource grant. For example, in any of the example resource grants described with respect to block 806, the frequency (or frequencies) to be used by the scheduled entity for transmission may be indicated in one or more ways. For example, a frequency to be used may be indicated in a resource grant in the carrier indicator field (CIF) of downlink control information (DCI) (e.g., DCI format 5A) in a physical downlink control channel (PDCCH).

At block 808, the scheduled entity may transmit the data based on the resource grant. For example, the scheduled entity may transmit the data (e.g., one or more data packets) using the one or more frequencies indicated in the resource grant.

In one configuration, the apparatus 400 for wireless communication includes means for obtaining data that is to be transmitted, wherein one or more frequencies are available for transmission of the data, means for transmitting, to a scheduling entity, a message that includes an amount of the data to be transmitted and a frequency parameter indicating at least one of the one or more frequencies to be used for the transmission of the data, means for obtaining, from the scheduling entity, a resource grant based on the message, and means for transmitting the data based on the resource grant. In one aspect, the aforementioned means may be the processor 404 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1, 2, and/or 4, and utilizing, for example, the processes and/or algorithms described herein in relation to FIG. 8.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication, comprising:
   obtaining, at a scheduled entity, data that is to be transmitted, wherein one or more frequencies are available for transmission of the data;
   transmitting, to a scheduling entity, a message that includes an amount of the data to be transmitted and a frequency parameter, wherein the frequency parameter is a frequency index value that indicates at least one frequency of the one or more frequencies to be used for the transmission of the data, wherein the at least one frequency is included in at least a dedicated frequency list that is specific to the scheduled entity, wherein the message comprises a buffer status report message format that includes at least a destination index field, and wherein the destination index field contains only the frequency index value;
   obtaining, from the scheduling entity, a resource grant based on the message; and
   transmitting the data based on the resource grant.

2. The method of claim 1, wherein the frequency index value points to the dedicated frequency list when both the dedicated frequency list and a common frequency list are provided to the scheduled entity.

3. The method of claim 1, wherein the one or more frequencies available for transmission of the data are included in at least a common frequency list or the dedicated frequency list that is specific to the scheduled entity.

4. The method of claim 3, wherein the frequency index value points to the dedicated frequency list when both the dedicated frequency list and the common frequency list are provided to the scheduled entity.

5. The method of claim 1, wherein the message further includes a logical channel group identifier corresponding to the data.

6. The method of claim 1, wherein the data is associated with a particular service, and wherein the at least one frequency indicated by the frequency parameter is associated with the particular service.

7. The method of claim 1, wherein the data is associated with a particular logical channel group identifier, and wherein the at least one frequency indicated by the frequency parameter is associated with the particular logical channel group identifier.

8. The method of claim 1, wherein the at least one frequency is a sidelink frequency.

9. The method of claim 1, wherein the message is a buffer status report message.

10. The method of claim 9, wherein the buffer status report message indicates a plurality of buffer sizes, wherein each of the plurality of buffer sizes corresponds to one frequency of the one or more frequencies.

11. The method of claim 1, wherein the buffer status report message format excludes a frequency index field.

12. The method of claim 1, wherein the buffer status report message format comprises a conventional buffer status report message format.

13. An apparatus for wireless communication comprising:
   a processor;
   a transceiver communicatively coupled to the processor; and
   a memory communicatively coupled to the processor, wherein the processor is configured to:
      obtain data that is to be transmitted, wherein one or more frequencies are available for transmission of the data;
      transmit, to a scheduling entity, a message that includes an amount of the data to be transmitted and a frequency parameter, wherein the frequency parameter is a frequency index value that indicates at least one frequency of the one or more frequencies to be used for the transmission of the data, wherein the at least one frequency is included in at least a dedicated frequency list that is specific to the scheduled entity, wherein the message comprises a buffer status report message format that includes at least a destination index field, and wherein the destination index field contains only the frequency index value;
      obtain, from the scheduling entity, a resource grant based on the message; and
      transmit the data based on the resource grant.

14. The apparatus of claim 13, wherein the message is a buffer status report message.

15. A method for wireless communication, comprising:
   obtaining, from a scheduled entity, a message that includes an amount of data to be transmitted and a frequency parameter, wherein the frequency parameter is a frequency index value that indicates at least one frequency of one or more frequencies to be used for transmission of the data, wherein the at least one frequency is included in at least a dedicated frequency list that is specific to the scheduled entity, wherein the message comprises a buffer status report message format that includes at least a destination index field, and wherein the destination index field contains only the frequency index value; and
   transmitting, to the scheduled entity, a resource grant based on the message.

16. The method of claim 15, wherein the frequency index value points to the dedicated frequency list when both the dedicated frequency list and a common frequency list are provided to the scheduled entity.

17. The method of claim 15, wherein the at least one frequency to be used for the transmission of the data is included in at least a common frequency list or the dedicated frequency list that is specific to the scheduled entity.

18. The method of claim 17, wherein the frequency index value points to the dedicated frequency list when both the dedicated frequency list and a common frequency list are provided to the scheduled entity.

19. The method of claim 15, wherein the one or more frequencies includes at least one sidelink frequency.

20. An apparatus for wireless communication comprising:
   a processor;
   a transceiver communicatively coupled to the processor; and
   a memory communicatively coupled to the processor, wherein the processor is configured to:
      obtain, from a scheduled entity, a message that includes an amount of data to be transmitted and a frequency parameter, wherein the frequency parameter is a frequency index value that indicates at least one frequency of one or more frequencies to be used for transmission of the data, wherein the at least one frequency is included in at least a dedicated frequency list that is specific to the scheduled entity, wherein the message comprises a buffer status report message format that includes at least a destination index field, and wherein the destination index field contains only the frequency index value; and
      transmit, to the scheduled entity, a resource grant based on the message.

21. The apparatus of claim 13, wherein the at least one frequency is a sidelink frequency.

22. The apparatus of claim 20, wherein the frequency index value points to the dedicated frequency list when both the dedicated frequency list and a common frequency list are provided to the scheduled entity.

23. The apparatus of claim 20, wherein the at least one frequency to be used for the transmission of the data is included in at least a common frequency list or the dedicated frequency list that is specific to the scheduled entity.

24. The apparatus of claim 23, wherein the frequency index value points to the dedicated frequency list when both the dedicated frequency list and the common frequency list are provided to the scheduled entity.

25. The apparatus of claim 20, wherein the one or more frequencies includes at least one sidelink frequency.

26. The apparatus of claim 20, wherein the message is a buffer status report message.

\* \* \* \* \*